United States Patent
Engfehr et al.

(10) Patent No.: US 10,570,833 B2
(45) Date of Patent: Feb. 25, 2020

(54) SYSTEM AND METHOD FOR PREDICTING FAILURE OF A CYLINDER IN A MULTI-CYLINDER ENGINE

(71) Applicant: Caterpillar Inc., Peoria, IL (US)

(72) Inventors: Matthew J. Engfehr, Dunlap, IL (US); Nathan P. Atterberry, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 172 days.

(21) Appl. No.: 15/803,885

(22) Filed: Nov. 6, 2017

(65) Prior Publication Data

US 2019/0136771 A1      May 9, 2019

(51) Int. Cl.
*F02D 35/02* (2006.01)
*F02D 41/00* (2006.01)
(Continued)

(52) U.S. Cl.
CPC .......... *F02D 35/023* (2013.01); *F02B 77/085* (2013.01); *F02D 41/009* (2013.01);
(Continued)

(58) Field of Classification Search
CPC .... F02D 35/023; F02D 41/009; F02D 41/222; F02D 2041/285; F02B 77/085; G01M 15/08; B60R 16/0232
See application file for complete search history.

(56) References Cited

U.S. PATENT DOCUMENTS

| | | | |
|---|---|---|---|
| 5,469,735 A | 11/1995 | Watanabe | |
| 2004/0187847 A1* | 9/2004 | Viele | F02D 35/021 |
| | | | 123/406.27 |

(Continued)

FOREIGN PATENT DOCUMENTS

DE      102015009202      8/2016

OTHER PUBLICATIONS

J. A. Gatowski et al., "Heat Release Analysis of Engine Pressure Data," SAE Transactions, vol. 93, Section 5: 841110-841378, pp. 961-977 (1984).

(Continued)

*Primary Examiner* — Daniel S Larkin
*Assistant Examiner* — Anthony W Megna Fuentes
(74) *Attorney, Agent, or Firm* — Hibshman Claim Construction PLLC

(57) ABSTRACT

A method for predicting failure in a cylinder of a multi-cylinder engine is provided. Each cylinder has an associated pressure sensor to provide a signal indicative of pressure in the cylinder. The method includes identifying whether there is a non-fueling interval associated with any of the cylinder on the engine. The method includes determining at least one of parameters such as an indicated mean effective pressure, a peak cylinder pressure, a total heat released, or a total duration of heat released over a combustion cycle for the cylinder. The method includes comparing the at least one of the parameters with predefined threshold value, determining whether any of the parameters exceeds the predefined threshold value, and generating a signal indicating the impending cylinder failure if at least one of the parameters exceeds the corresponding predefined threshold value.

20 Claims, 4 Drawing Sheets

(51) Int. Cl.
   G01M 15/08      (2006.01)
   F02B 77/08      (2006.01)
   F02D 41/22      (2006.01)
   B60R 16/023     (2006.01)
   F02D 41/28      (2006.01)
   F02B 75/18      (2006.01)
   F02D 41/30      (2006.01)

(52) U.S. Cl.
   CPC ........... *F02D 41/222* (2013.01); *G01M 15/08* (2013.01); *B60R 16/0232* (2013.01); *F02D 2041/285* (2013.01)

(56)        References Cited

U.S. PATENT DOCUMENTS

| 2007/0044761 A1* | 3/2007 | Hoshi | F02D 13/0226 123/435 |
| 2008/0264360 A1* | 10/2008 | Dagci | F02D 35/023 123/52.1 |
| 2013/0060447 A1* | 3/2013 | Guerrassi | F02D 35/025 701/102 |
| 2014/0172277 A1* | 6/2014 | Klett | F02D 41/345 701/105 |
| 2018/0135544 A1* | 5/2018 | Kalweit | F02D 41/0097 |

OTHER PUBLICATIONS

J. A. Topinka et al., "Correlation of Single-Cylinder to Multi-Cylinder Performance for a Medium Speed Diesel Engine," Proceedings of the ASME 2006 Internal Combustion Engine Division Spring Technical Conference, ASME 2006 Internal Combustion Engine Division Spring Technical Conference (ICES2006), Aachen, Germany, pp. 257-265 (May 7-10, 2006).

* cited by examiner

SYSTEM AND METHOD FOR PREDICTING FAILURE OF A CYLINDER IN A MULTI-CYLINDER ENGINE

TECHNICAL FIELD

The present disclosure relates to a multi-cylinder internal combustion engine. More particularly, the present disclosure relates to a system and method for predicting a failure of a cylinder in the multi-cylinder internal combustion engine.

BACKGROUND

An engine having a plurality of cylinders typically requires an initial investment cost and regular maintenance costs associated with operation of the engine. Thus, it would be advantageous to have systems for early detection of any impending failure in components of the engine. Some of the early detection strategies may include, for example, an early detection of a knocking condition, an early detection of a cylinder failure, or any other event which may cause damage to the engine. Any such failure may increase downtime and expense incurred towards repair and replacement of the failed components.

Traditionally, symptoms of a cylinder failure may include high exhaust temperature, excessive smoke in the exhaust, or high crankcase pressure due to a loss of compression in a cylinder. These symptoms may be indicative of a failure of a piston, a piston ring, or a cylinder liner of the engine, and therefore can be used as a sign for a failure of the cylinder. When a loss of compression occurs in a cylinder of an engine, a engine failure usually follows shortly thereafter. Thus, any delay in detecting an impending cylinder failure could adversely affect performance of the engine in operation and may increase an amount of downtime required by the engine for subsequent maintenance of the failed cylinder. Further, continued operation of the engine with the failed cylinder may negatively impact operation of other components in the engine which could have been avoided if early detection before loss of compression in a cylinder was performed.

German Patent Application 10 2015 009 202 (hereinafter referred to as "the '202 reference") relates to a cylinder pressure module for an internal combustion engine. The cylinder pressure module receives combustion chamber pressure values from a pressure sensing device. This pressure sensing device measures combustion chamber pressures as a function of time, crankshaft angle and camshaft angle. Further, the '202 reference discloses a pressure-core analysis device associated with the cylinder pressure module. This pressure-core analysis device evaluates a combustion cycle of the engine from the received combustion chamber pressure values. The cylinder pressure module of the '202 reference is configured to perform, amongst other things, a detection of a knocking event, and a detection of a cylinder failure. However, the '202 reference does not disclose a manner in which these failures could be detected on the basis of the measured values of combustion chamber pressures.

SUMMARY

In an aspect of the present disclosure, a method for predicting failure of a cylinder in an engine having a plurality of cylinders is provided. Each cylinder from the plurality of cylinders is associated with a pressure sensor. The method includes receiving a signal indicative of a cylinder pressure from each of the pressure sensors associated with corresponding ones of the cylinders. The method includes identifying whether there is a non-fueling interval in a cylinder from the multiple cylinders by means of the controller. The method includes determining, by means of the controller, at least one of: an indicated mean effective pressure (IMEP), a peak cylinder pressure (PCP), a total heat released, or total duration of heat release from the cylinder pressure over a complete combustion cycle for the cylinder in which the non-fueling interval is identified.

The method includes comparing at least of: the IMEP, the PCP, the total heat released, and the total duration of heat released of the identified cylinder to a corresponding predefined threshold value, and determining whether at least one of the IMEP, the PCP, the total heat released, or the total duration of heat released for the identified cylinder exceeds the corresponding predefined threshold value. The method also includes generating a signal indicative of the impending cylinder failure if at least one of the IMEP, the PCP, the total heat released, or the total duration of heat released for the identified cylinder exceeds the corresponding predefined threshold value.

In another aspect of the present disclosure, a system for predicting failure of a cylinder in an engine having a plurality of cylinders is provided. Each cylinder of the engine is associated with a corresponding pressure sensor. The system includes a controller that is disposed in communication with the pressure sensors associated with each of the cylinders. The controller receives a signal from each of the pressure sensors indicative of a cylinder pressure in a corresponding cylinder from the plurality of cylinders. The controller identifies whether there is a non-fueling interval in a cylinder from the plurality of cylinders.

The controller then determines at least one of: an indicated mean effective pressure (IMEP), a peak cylinder pressure (PCP), a total heat released, and a total duration of heat released from the cylinder pressure over a complete combustion cycle for the cylinder in which the non-fueling interval is identified. The controller compares at least one of the IMEP, the PCP, the total heat released, or the total duration of heat released of the identified cylinder to a corresponding predefined threshold value, and determines whether at least one of the IMEP, the PCP, the total heat released, or the total duration of heat released of the identified cylinder exceeds the corresponding predefined threshold value. The controller also generates a signal that is indicative of the impending cylinder failure if at least one of the IMEP, the PCP, the total heat released, or the total duration of heat released of the identified cylinder exceeds the corresponding predefined threshold value.

In yet another aspect of the present disclosure, a dual fuel engine system includes an engine having a plurality of cylinders. Each cylinder from the plurality of cylinders has a pressure sensor associated therewith. The dual fuel engine system further includes a controller communicably coupled to each of the pressure sensors. The controller receives a signal from each of the pressure sensors indicative of a cylinder pressure in a corresponding cylinder from the plurality of cylinders. The controller identifies whether there is a non-fueling interval in a cylinder from the plurality of cylinders.

The controller then determines at least one of: an indicated mean effective pressure (IMEP), a peak cylinder pressure (PCP), a total heat released, and a total duration of heat released from the cylinder pressure over a complete combustion cycle for the cylinder in which the non-fueling interval is identified. The controller compares at least one of the IMEP, the PCP, the total heat released, or the total duration of heat released of the identified cylinder to a corresponding predefined threshold value, and determines whether at least one of the IMEP, the PCP, the total heat released, or the total duration of heat released of the identified cylinder exceeds the corresponding predefined threshold value. The controller also generates a signal that is indicative of the impending cylinder failure if at least one of the IMEP, the PCP, the total heat released, or the total duration of heat released of the identified cylinder exceeds the corresponding predefined threshold value.

DETAILED DESCRIPTION

Figure 1:
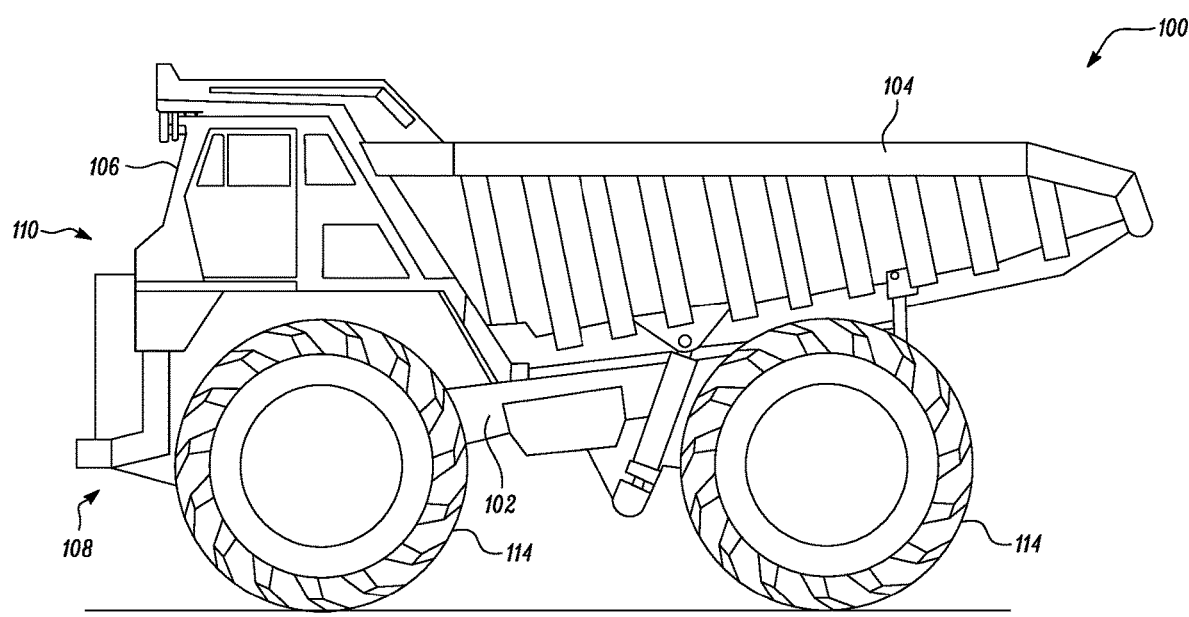
FIG. 1 illustrates an exemplary machine, according to an aspect of the present disclosure.

Wherever possible, the same reference numbers will be used throughout the drawings to refer to same or like parts. FIG. 1 illustrates an exemplary machine 100, according to an embodiment of the present disclosure. More specifically, as shown in FIG. 1, the machine 100 may embody a large mining truck (LMT). It should be noted that although a LMT is depicted in the illustrated embodiment of FIG. 1, in other embodiments, the machine 100 may alternatively include an off-highway truck, a quarry truck, an articulated truck, a wheel loader, a tractor, a locomotive, a generator set, or any other machine in which aspects of the present disclosure may be applied.

Referring to FIG. 1, the machine 100 includes a frame 102. A payload carrier 104 is pivotally mounted to the frame 102. Further, an operator cab 106 is mounted to the frame 102 above an engine enclosure 108 and located on a front side 110 of the frame 102. The operator cab 106 may include various systems for operating the machine 100. The machine 100 may be supported on a ground surface by a plurality of wheels 114. Although wheels 114 are disclosed herein, in alternative embodiments, the machine 100 could include other types of ground engaging members such as tracks in lieu of the wheels 114 disclosed herein.

Figure 2:
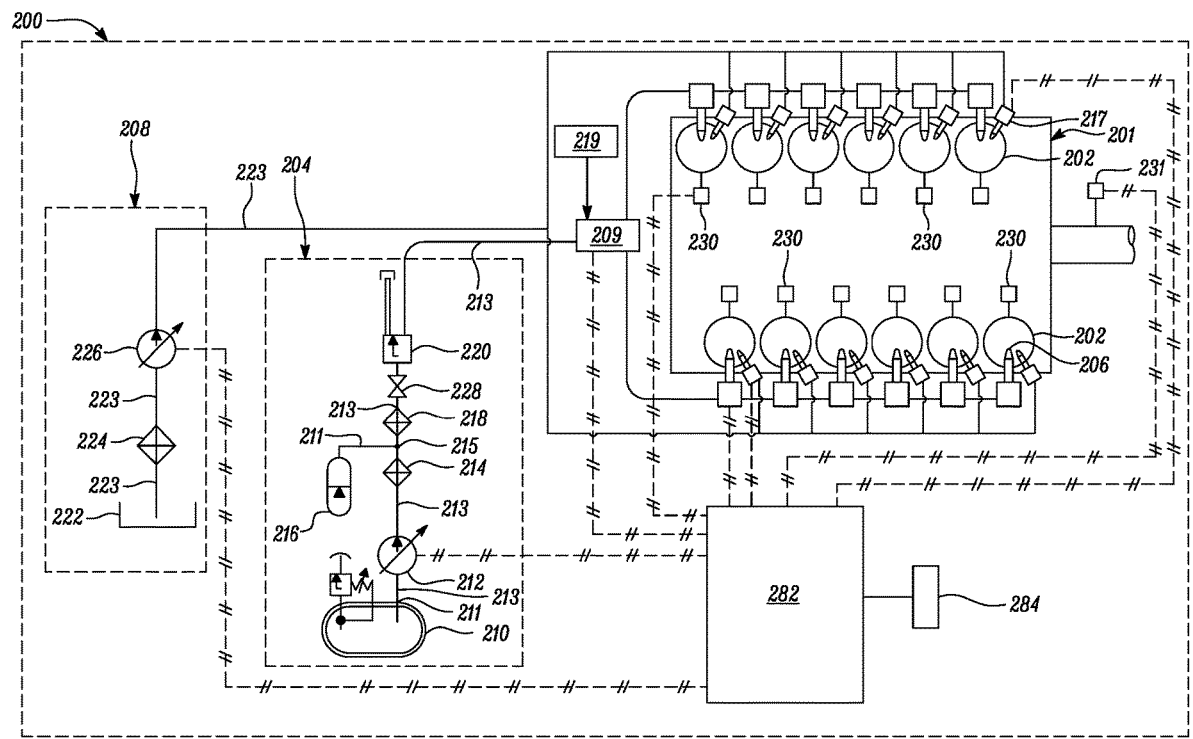
FIG. 2 illustrates a schematic representation of an engine system, according to an aspect of the present disclosure.

One or more power sources (not shown) may be housed within the engine enclosure 108. The power source would be configured to provide power to the wheels 114 so that the machine 100 could be propelled on the ground surface. In an embodiment, the power source is a dual fuel engine system 200 as shown in FIG. 2. For simplicity in this disclosure, the dual fuel engine system 200 is hereinafter referred to as "the engine system" and denoted by identical numeral "200". It should be apparent that the subject matter of the present disclosure may also apply to single fuel engines (e.g. diesel, gasoline, natural gas, hydrogen, etc.) and multi-fuel engines without departing from the scope of the appended claims.

Referring to FIG. 2, the engine system 200 includes an engine 201 having multiple cylinders 202 that are configured to combust an air-fuel mixture to produce power. In the illustrated embodiment of FIG. 2, the engine 200 includes twelve cylinders 202. However, in other embodiments, the engine 200 could be a multi-cylinder engine that is configured to include fewer or more cylinders.

Each of these cylinders 202 is provided with a first fuel injector 206 and a second fuel injector 217 that are configured to operatively provide a supply of a first type of fuel and a second type of fuel respectively to corresponding ones of the cylinders 202. In the illustrated embodiment of FIG. 2, the engine 201 may be a diesel-gas blended engine in which each of the cylinders 202 may typically receive a compression ignited fuel, for instance, diesel, or a lesser volatile fuel, for example, liquified natural gas (LNG), or a combination of both. However, it will be appreciated by persons skilled in the art that aspects disclosed herein can be similarly applied in the cases of a pure compression ignited (CI) fuel engine such as a diesel engine, or a dual fuel direct injected gas (DIG) engine such as a diesel-LNG DI engine, or a pure spark ignited natural gas or gasoline engine without limiting the scope of the present disclosure.

In the illustrated embodiment of FIG. 2, the engine system 200 includes a first fuel delivery system 204 and a second fuel delivery system 208. The first fuel delivery system 204 is disposed in selective fluid communication with each of the first fuel injectors 206 with the help of a fuel blending device 209 that is configured to receive a supply of pressurized air from an air source 219, for example, a turbocharger. The fuel blending device 209 is configured to mix the first type of fuel with a desired amount of air so that the first type of fuel and the air constitute a premix charge. Although one fuel blending device 209 is disclosed herein, it may be noted that in other embodiments, more than one fuel blending device 209 may be provided in the engine system 200. For example, one fuel blending device 209 may be provided to correspond with each first fuel injector 206 present on the engine 201.

As shown in FIG. 2, the first fuel delivery system 204 may include a cryogenic tank 210 that is configured to store a volume of the first type of fuel (hereinafter referred to as "the first fuel"). The first fuel disclosed herein may be, e.g., liquified natural gas (LNG). This cryogenic tank 210 has an outlet 211 fluidly connected to a variable displacement cryogenic pump 212 via a first supply line 213. A heat exchanger 214 may be disposed in the first fuel supply line 213 and located downstream of the variable displacement cryogenic pump 212. The heat exchanger 214 may be configured to regulate a temperature of the first fuel prior to the first fuel entering the fuel blending device 209.

Further, as shown in the illustrated embodiment of FIG. 2, a gas filter 218 and a fuel conditioning module 220 may be disposed in the first fuel supply line 213 and located downstream of the heat exchanger 214. The gas filter 218 may be configured to filter any undesired contaminants present in the first fuel. The fuel conditioning module 220 may be configured to regulate a pressure of the first fuel in the first fuel supply line 213 before the first fuel is provided to the fuel blending device 209.

Further, as shown in the illustrated embodiment of FIG. 2, the first fuel delivery system 204 may also include an accumulator 216 disposed in a line 211 that is configured to branch-off from a point 215 on the first fuel supply line 213 located between the heat exchanger 214 and the gas filter 218. The accumulator 216 may be configured to store a finite volume of the first fuel during operation of the first fuel delivery system 204.

With continued reference to the illustrated embodiment of FIG. 2, the second fuel delivery system 208 includes a fuel tank 222 that is configured to store a volume of the second type of fuel (hereinafter referred to as "the second fuel").

The second fuel may be, for example, diesel. This fuel tank 222 may be provided with a second fuel supply line 223. A fuel filter 224 is disposed in the second fuel supply line 223 and located downstream of the fuel tank 222. Also, a variable displacement high-pressure fuel pump 226 may be disposed in the second fuel supply line 223 and located downstream of the fuel filter 224. The fuel pump 226 may be configured to increase a pressure of the second fuel that is drawn from the fuel tank 222 and provide a pressurized flow of the second fuel to each of the second fuel injectors 217.

The engine system 200 also includes a system for predicting failure or damage to one or more components in one or more cylinders 202 of the engine 201. As shown in FIG. 2, the system has a plurality of pressure sensors 230 that correspond with the plurality of cylinders 202 present on the engine 201. In an embodiment, each of these pressure sensors 230 may embody an in-cylinder pressure sensor that could be associated with corresponding ones of the cylinders 202. Each of these pressure sensors 230 may be configured to output a value that is indicative of an instantaneous pressure associated with a corresponding one of the cylinders 202.

The system also includes a controller 282 that is disposed in communication with each of the pressure sensors 230. The controller 282 may also be disposed in communication with the variable displacement cryogenic pump 212, the variable displacement high-pressure fuel pump 226, the fuel blending device 209, each of the first fuel injectors 206, and each of the second fuel injectors 217. Although the controller 282 is shown connected to one of the first fuel injectors 206, one of the second fuel injectors 217, and one of the pressure sensors 230 in the illustrated embodiment of FIG. 2, it should be noted that the controller 282 is disposed in independent communication with each of the first fuel injectors 206, each of the second fuel injectors 217, and each of the pressure sensors 230 for performing functions consistent with the present disclosure.

Depending on specific requirements of an engine fueling application including, but not limited to, speed and load conditions associated with the engine, or operating conditions associated with an exhaust after-treatment system (not shown) downstream of the engine 201, the controller 282 may be configured to control operation of the variable displacement cryogenic pump 212, the variable displacement high-pressure fuel pump 226, and the fuel blending device 209 to selectively vary an amount of each of the first and second types of fuel to be delivered to each of the first fuel injectors 206 and each of the second fuel injectors 217 respectively for combustion at corresponding ones of the cylinders 202 present on the engine 201. Moreover, depending on specific requirements of an engine fueling application mentioned above, the controller 282 may also control an operation of each of the first and second fuel injectors 206, 217 to selectively supply each of the first fuel (by means of the pre-mix charge) and the second fuel from respective ones of the first fuel injectors 206 and the second fuel injector 217 to corresponding ones of the cylinders 202 present on the engine 201.

The controller 282 disclosed herein could include various software and/or hardware components that are configured to perform functions consistent with the present disclosure. As such, the controller 282 of the present disclosure may be a stand-alone control module or may be configured to co-operate with an existing electronic control module (ECU) (not shown) of the machine 100. Further, it may be noted that the controller 282 disclosed herein may embody a single microprocessor or multiple microprocessors that include components for selectively and independently actuating specific system hardware associated with the engine system 200 of the present disclosure.

Numerous commercially available microprocessors can be configured to perform the functions of the controller 282 disclosed herein. It should be appreciated that the controller 282 could readily be embodied in a microprocessor capable of controlling numerous machine functions. The controller 282 may include a memory, a secondary storage device, a processor, and any other components for running an application. Various other circuits may be associated with the controller 282 such as power supply circuitry, signal conditioning circuitry, solenoid driver circuitry, and other types of circuitry. Various routines, algorithms, and/or programs can be programmed within the controller 282 for execution thereof to actuate specific system hardware associated with the engine system 200.

During operation of the engine 201, each of the pressure sensors 230 may be configured to output a value that is indicative of instantaneous pressure associated with corresponding ones of the cylinders 202. The controller 282 receives the signals indicative of the instantaneous pressure in each of the cylinders 202 from corresponding ones of the pressure sensors 230.

The controller 282 is configured to identify a non-fueling interval associated with one or more cylinders 202 from the plurality of cylinders 202 present on the engine 201. The terms "non-fueling interval" may refer to an interval during which fuel is not supplied to one or more cylinders 202 from the plurality of cylinders 202 present on the engine 201. An exemplary situation of a non-fueling interval may occur when the machine 100 is travelling downhill on a slope and one or more cylinders 202 do not receive fuel i.e., the first and the second types of fuel. It may be noted that the controller 282 may be configured to identify the non-fueling interval based on various operating conditions of the engine system 200 including, but not limited to, a relationship between load demand on the engine with a current throttle command, a current state of each of the first and second fuel injectors 206, 217 associated with a given cylinder 202 of the engine 201, and various other operating conditions of the engine system 200 known to persons skilled in the art. In an embodiment, the controller 282 may cut off the supply of fuel i.e., the first and the second types of fuel into one or more cylinders 202 for at least one combustion cycle.

In one embodiment, upon identifying the cylinder 202 in which the non-fueling interval is occurring, the controller 282 may determine an indicated mean effective pressure (IMEP) from the instantaneous cylinder pressure, as sensed by the pressure sensor 202, associated with the identified cylinder 202 over a complete combustion cycle of the identified cylinder 202. Upon determining the IMEP of the identified cylinder 202, the controller 282 compares the IMEP with a pre-defined threshold value. In this embodiment, the pre-defined threshold value could be, for example, an average of the cylinder pressures of the cylinders 202 present on the engine 201 excluding the identified cylinder 202 in which the non-fueling event occurred.

The controller 282 then determines whether the IMEP of the identified cylinder 202 exceeds the pre-defined threshold value. If the IMEP of the identified cylinder 202 exceeds the pre-defined threshold value, then the controller 282 generates a signal indicative of possible damage to a component of the identified cylinder 202 and that may provide an indication of an impending failure or damage to one or more components of the identified cylinder 202. In an example, if the pre-defined threshold value is −0.15 Megapascal (MPa) and if the controller 282 determines that the IMEP of the identified cylinder 202 is 0.4 MPa, then the controller 282 generates the signal indicating possibility of an impending failure or damage to one or more components of the identified cylinder 202. In this example, this would suggest that the identified cylinder 202 is not performing as designed and it is likely that fuel or oil is combusting in the identified cylinder 202 when it is not intended to do so during the non-fueling event.

The controller 282 may generate the signal in the form of an alarm, an alert, or a notification to an operator, a remote back-office, or any other personnel concerned with the operation of the engine system 200. Such signal may be indicated visually, haptically, aurally, or in any other known manner with the help of a notification device 284 communicably coupled to the controller 282. This way, the operator, the remote back-office, or personnel concerned with the operation of the engine system 200 could be notified by the notification device 284 that maintenance is required on the identified cylinder 202 in which failure is likely to occur.

In a further embodiment, if the controller 282 has determined that the IMEP of the identified cylinder 202 has exceeded the pre-defined threshold value, then the controller 282 may additionally, or optionally, cutoff fuel supply to the identified cylinder 202 i.e., the cylinder 202 that is likely to undergo failure by sending a command signal to the first fuel injector 206 and the second fuel injector 217 associated with the identified cylinder 202. This way, the controller 282 could de-rate the available output power from the engine 201.

In an alternative embodiment, upon identifying the cylinder 202 in which the non-fueling interval is occurring, the controller 282 may determine a peak cylinder pressure (PCP) of the identified cylinder 202 in lieu of the IMEP disclosed in the foregoing embodiment. The controller 282 may determine the PCP of the identified cylinder 202 from the instantaneous cylinder pressure as sensed by the pressure sensor 202 associated with the identified cylinder 202 over a complete combustion cycle of the identified cylinder 202.

Upon determining the PCP for the identified cylinder 202, the controller 282 compares the PCP of the identified cylinder 202 with a pre-defined threshold value. In this embodiment, the pre-defined threshold value could be provided before-hand to the controller 282 in the form of a map or lookup table. The controller 282 could be configured to select the pre-defined threshold value from the map or the look up table corresponding to a current engine speed that could be measured by an engine speed sensor 231 communicably coupled to the controller 282. It should be noted that the map or the look up table disclosed herein may be obtained based on empirical calculations incorporating theoretical models, statistical models, simulated models or combinations thereof, or from experimental data and/or trial runs performed on the engine 201 taking into consideration the varying conditions of speed that could be associated with the engine 201 in operation.

The controller 282 then determines whether the PCP of the identified cylinder 202 exceeds the pre-defined threshold value. If the PCP of the identified cylinder 202 exceeds the pre-defined threshold value, then the controller 282 generates a signal indicative of an impending failure or damage to one or more components of the identified cylinder 202.

In an alternative embodiment, upon identifying the cylinder 202 in which the non-fueling interval is occurring, the controller 282 may determine at least one of the total heat released or a total duration of heat released in the identified cylinder 202. The controller 282 may determine the total heat released or a total duration of heat released in the identified cylinder 202 from the instantaneous cylinder pressure as sensed by the pressure sensor 202 associated with the identified cylinder 202 over a complete combustion cycle of the identified cylinder 202.

Upon determining the total heat released or the total duration of heat released for the identified cylinder 202, the controller 282 compares the total heat released or the total duration of heat released in the identified cylinder 202 with a pre-defined threshold value. In this embodiment, the pre-defined threshold value could be provided before-hand to the controller 282 in the form of a map or lookup table. The controller 282 could be configured to select the pre-defined threshold value from the map or the look up table corresponding to a pressure in an air intake manifold associated with the engine 201 and communicably coupled to the controller 282. It should be noted that the map or the look up table disclosed herein may be obtained based on empirical calculations incorporating theoretical models, statistical models, simulated models or combinations thereof, or from experimental data and/or trial runs performed on the engine 201.

The controller 282 then determines whether the total heat released or the total duration of heat released in the identified cylinder 202 exceeds the pre-defined threshold value. If the total heat released or the total duration of heat released of the identified cylinder 202 exceeds the pre-defined threshold value, then the controller 282 generates a signal indicative of an impending failure or damage to one or more components of the identified cylinder 202.

Figure 3:
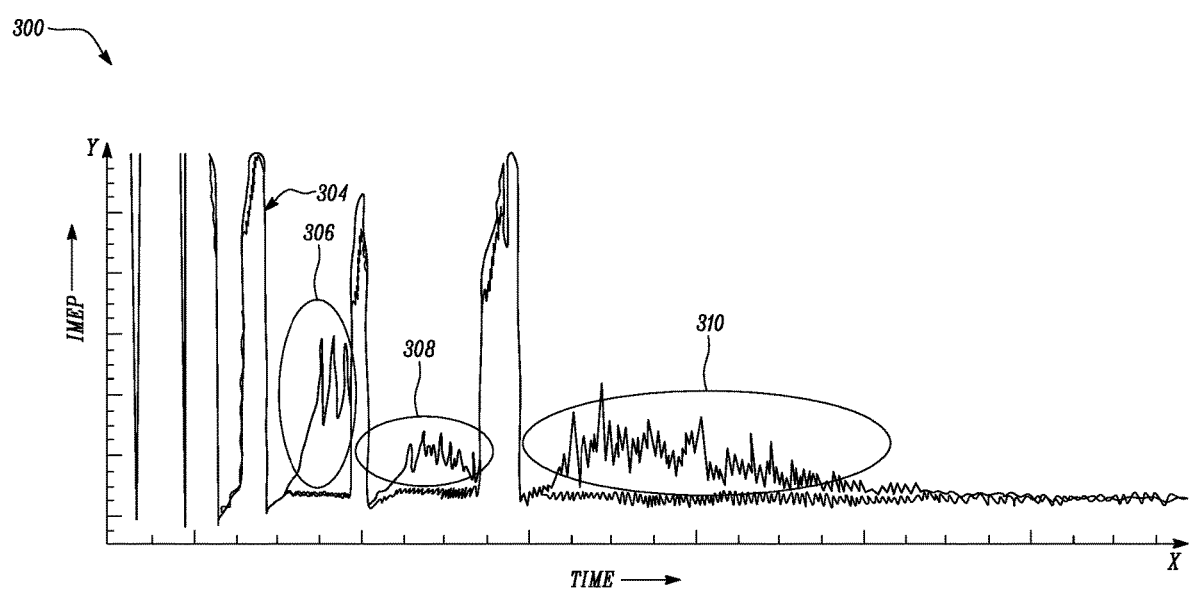
FIG. 3 illustrates an exemplary graph depicting a plot of the variation of indicated mean effective Pressure (IMEP) with respect to time, according to an aspect of the present disclosure.

FIG. 3 shows an exemplary graph 300 depicting an impending failure of a cylinder in a multi-cylinder engine. The graph 300 contains a plot 304 of the IMEP associated with each cylinder, for instance, each of the twelve cylinders 202 associated with the engine 201 of FIG. 1. As shown, IMEP is represented along the Y-axis with respect to time that is represented on the X-axis. The plot 304 is representative of variation in the IMEP over time for each of the twelve cylinders 202. During normal engine operation, the IMEP for all the cylinders 202 should be substantially the same, with minor variations. As illustrated, regions 306, 308, and 310 of the plot 304 show a deviation in the IMEP for the identified one of the cylinders 202 with the IMEP for a remainder of the cylinders 202 present on the engine 201, pursuant to which, the controller 282 determines that the identified cylinder 202 is likely to encounter failure.

Although the graph 300 of FIG. 3 depicts the plot 304 of the IMEP associated with each cylinder 202 with respect to time, in another embodiment, it can be contemplated to use another graph (not shown) that may be configured to depict a plot between the PCP associated with each cylinder 202 with respect to engine speed. In such an embodiment where the controller 282 determines the PCP of the identified cylinder 202, the controller 282 may select a predefined threshold value from the map of the peak cylinder pressures for the plurality of cylinders 202 present on the engine 201 excluding the cylinder 202 in which the non-fueling interval is identified.

INDUSTRIAL APPLICABILITY

The present disclosure has applicability for use and implementation in determining an impending failure or damage to one or more components in the cylinders 202 that is likely to occur in an engine.

Figure 4:
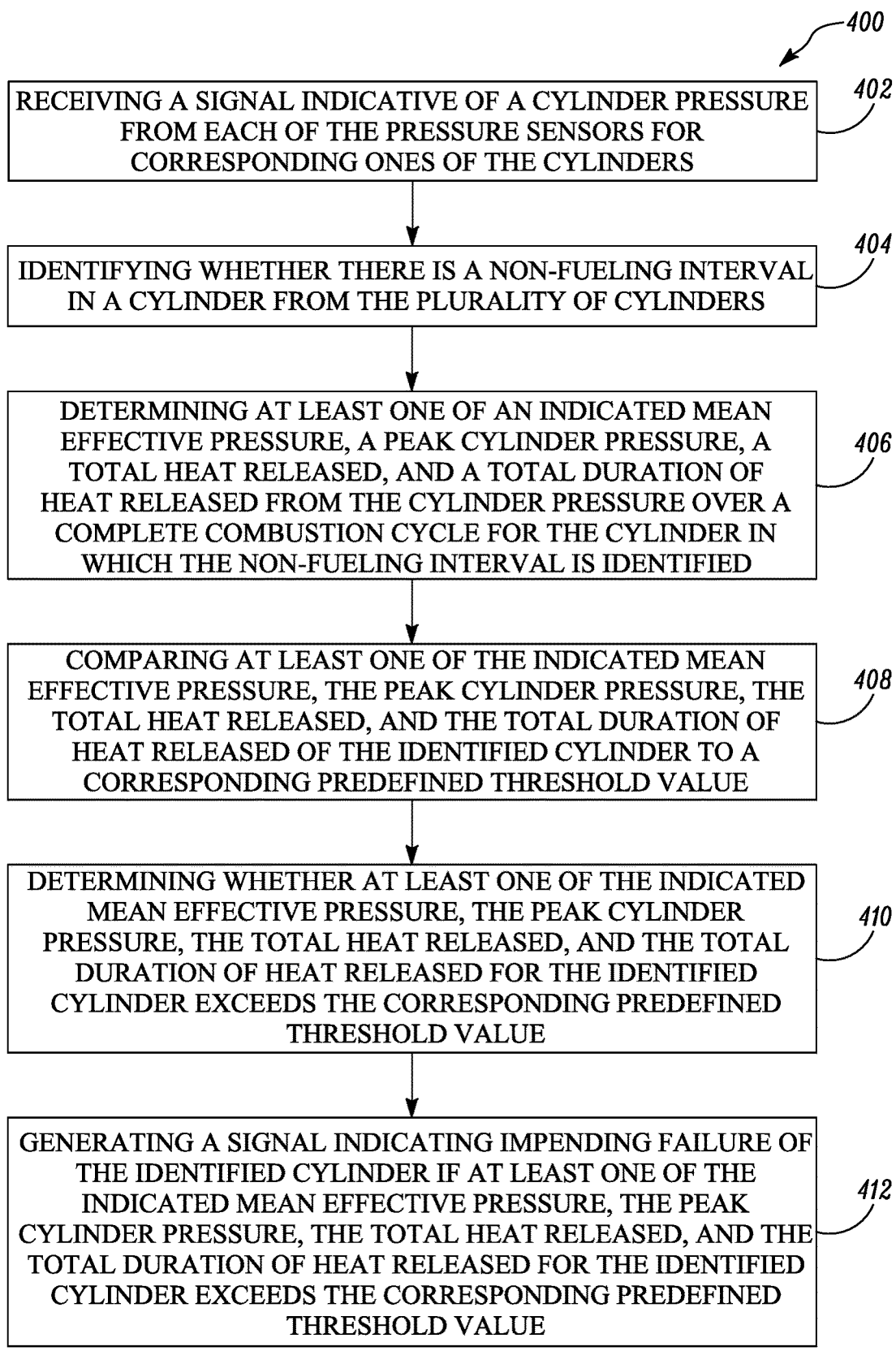
FIG. 4 illustrates a flow chart of a method for predicting a failure of a cylinder in an engine, according to an aspect of the present disclosure.

FIG. 4 illustrates a method 400 for predicting a failure of a cylinder in an engine, for instance, a failure of one of the cylinders 202 present on the engine 201 shown in FIG. 1. At step 402, the method 400 includes receiving the signal indicative of the cylinder pressure for each of the multiple cylinders 202 from the associated pressure sensors 230.

At step 404, the method 400 includes identifying whether there is the non-fueling interval occurring in any of the cylinders 202 present on the engine 201. As disclosed earlier herein, the controller 282 may identify the non-fueling interval based on various operating conditions of the engine system 200 and the combustion characteristics of each of the cylinders 202 present on the engine 201. At step 406, the method 400 includes determining at least one of the IMEP, the PCP, the total heat released and a total duration of the heat released for the identified one of the cylinders 202 from the instantaneous cylinder pressure measured by the pressure sensor 230 corresponding to the identified cylinder 202.

At step 408, the method 400 then includes comparing at least one of the IMEP, the PCP, the total heat released and a total duration of the heat released for the identified one of the cylinders 202 with a corresponding one of the predefined threshold values. At step 410, the controller 282 determines whether at least one of the IMEP, the PCP, the total heat released and a total duration of the heat released of the identified cylinder 202 exceeds a corresponding one of the predefined threshold values as disclosed earlier herein. If so, then at step 412, the method 400 includes generating, by the controller 282, a signal of an impending failure or damage to one or more components of the identified cylinder 202.

An early determination of a predicted cylinder failure provides the operator and service technician additional time to arrange for maintenance on the engine 201. Operators and service technicians can therefore, take remedial measures by halting engine operation prior to cylinder failure and performing maintenance on the engine. This way, operators could reduce unexpected downtimes of the machine, and also mitigate any loss in the productivity of the machine 100. Further, time and effort that would be required to carry out maintenance of the engine 201, if the cylinder 202 failed without any prior indication, may be reduced. Embodiments of the present disclosure therefore help detect any impending failures well in advance to allow an effective scheduling of the maintenance required for the engine 201.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for predicting failure of a cylinder in an engine having a plurality of cylinders and a plurality of pressure sensors, each pressure sensor of the plurality of pressure sensors being uniquely associated with a cylinder of the plurality of cylinders, the method comprising:
   receiving, by means of a controller, a signal indicative of a cylinder pressure from each pressure sensor;
   identifying, by means of the controller, whether there is a non-fueling interval in a cylinder from the plurality of cylinders;
   determining, by means of the controller, at least one of an indicated mean effective pressure, a peak cylinder pressure, a total heat released, and a total duration of heat released from the cylinder pressure over a complete combustion cycle for the cylinder in which the non-fueling interval is identified;
   comparing, by means of the controller, at least one of the indicated mean effective pressure, the peak cylinder pressure, the total heat released, and the total duration of heat released of the identified cylinder to a corresponding predefined threshold value;
   determining, by means of the controller, whether at least one of the indicated mean effective pressure, the peak cylinder pressure, the total heat released, and the total duration of heat released for the identified cylinder exceeds the corresponding predefined threshold value; and
   generating, by means of the controller, a signal indicating impending failure of the identified cylinder when at least one of the indicated mean effective pressure, the peak cylinder pressure, the total heat released, and the total duration of heat released for the identified cylinder exceeds the corresponding predefined threshold value.

2. The method of claim 1, further comprising cutting off, by means of the controller, fuel supply to the identified cylinder for which at least one of the indicated mean effective pressure, the peak cylinder pressure, the total heat released, and the total duration of heat released is determined as being in excess of the corresponding predefined threshold value.

3. The method of claim 2, wherein cutting off fuel supply to the identified cylinder includes cutting off supply of a first fuel to a first fuel injector and cutting off supply of a second fuel to a second fuel injector, the first fuel injector and the second fuel injector being associated with the identified cylinder for which at least one of the indicated mean effective pressure, the peak cylinder pressure, the total heat released, and the total duration of heat released is determined as being in excess of the corresponding predefined threshold value.

4. The method of claim 1, further comprising derating, by means of the controller, a maximum amount of output power available from the engine in response to determining that at least one of the indicated mean effective pressure, peak cylinder pressure, the total heat released, and the total duration of heat released of the identified cylinder is in excess of the corresponding predefined threshold value.

5. The method of claim 1, wherein when the indicated mean effective pressure is determined for the identified cylinder, the corresponding predefined threshold value is an average of indicated mean effective pressures of the plurality of cylinders present on the engine excluding the cylinder in which the non-fueling interval is identified.

6. The method of claim 1, wherein when the peak cylinder pressure is determined for the identified cylinder, the corresponding predefined threshold value is selected from a map of peak cylinder pressures for the plurality of cylinders present on the engine excluding the cylinder in which the non-fueling interval is identified, the map being configured to identify the peak cylinder pressures as a function of engine speed.

7. The method of claim 1, wherein when one of the total heat released, and the total duration of heat released is determined for the identified cylinder, the corresponding predefined threshold value is selected from a map of the total heat released, and the total duration of heat released for the plurality of cylinders present on the engine excluding the cylinder in which the non-fueling interval is identified, the map being configured to identify the total heat released, and the total duration of heat released as a function of air pressure in an air intake manifold of the engine.

8. The method of claim 1, wherein the signal indicative of the cylinder pressure is generated by means of an in-cylinder pressure sensor.

9. A system for predicting failure of a cylinder in an engine having a plurality of cylinders, the system comprising:
a plurality of pressure sensors, each pressure sensor of the plurality of pressure sensors corresponding uniquely to a cylinder of the plurality of cylinders; and
a controller communicably coupled to the plurality of pressure sensors, the controller being configured to
receive a signal from each pressure sensor indicative of a cylinder pressure in the corresponding cylinder of the plurality of cylinders,
identify whether there is a non-fueling interval in a cylinder from the plurality of cylinders,
determine at least one of an indicated mean effective pressure, a peak cylinder pressure, a total heat released, and a total duration of heat released from the cylinder pressure over a complete combustion cycle for the cylinder in which the non-fueling interval is identified,
compare at least one of the indicated mean effective pressure, the peak cylinder pressure, the total heat released, and the total duration of heat released of the identified cylinder to a corresponding predefined threshold value,
determine whether at least one of the indicated mean effective pressure, the peak cylinder pressure, the total heat released, and the total duration of heat released of the identified cylinder exceeds the corresponding predefined threshold value, and
generate a signal indicating impending failure of the identified cylinder when at least one of the indicated mean effective pressure, the peak cylinder pressure, the total heat released, and the total duration of heat released of the identified cylinder exceeds the corresponding predefined threshold value.

10. The system of claim 9, wherein the controller is further configured to cutoff fuel supply to the identified cylinder for which at least one of the indicated mean effective pressure, the peak cylinder pressure, the total heat released, and the total duration of heat released is determined as being in excess of the corresponding predefined threshold value.

11. The system of claim 10, wherein the controller is further configured to cutoff supply of a first fuel to a first fuel injector and cutoff supply of a second fuel to a second fuel injector, the first fuel injector and the second fuel injector being associated with the identified cylinder for which at least one of the indicated mean effective pressure, the peak cylinder pressure, the total heat released, and the total duration of heat released is determined as being in excess of the corresponding predefined threshold value.

12. The system of claim 9, wherein in response to at least one of the indicated mean effective pressure, the peak cylinder pressure, the total heat released, and the total duration of heat released of the identified cylinder being in excess of the corresponding predefined threshold value, the controller is further configured to derate a maximum amount of output power available from the engine.

13. The system of claim 9, wherein when the indicated mean effective pressure is determined for the identified cylinder, the controller is further configured to select the corresponding predefined threshold value as an average of indicated mean effective pressures of the plurality of cylinders present on the engine excluding the cylinder in which the non-fueling interval is identified.

14. The system of claim 9, wherein when the peak cylinder pressure is determined for the identified cylinder, the controller is configured to select the corresponding predefined threshold value from a map of peak cylinder pressures for the plurality of cylinders present on the engine excluding the cylinder in which the non-fueling interval is identified, the map being configured to identify the peak cylinder pressures as a function of engine speed.

15. The system of claim 9, wherein each of the pressure sensors is an in-cylinder pressure sensor.

16. A dual fuel engine system comprising:
an engine having a plurality of cylinders;
a plurality of pressure sensors, each pressure sensor of the plurality of pressure sensors being uniquely associated with a cylinder of the plurality of cylinders; and
a controller communicably coupled to each of the pressure sensors, the controller being configured to
receive a signal from each pressure sensor indicative of a cylinder pressure in a corresponding cylinder of the plurality of cylinders,
identify whether there is a non-fueling interval in a cylinder from the plurality of cylinders,
determine at least one of an indicated mean effective pressure, a peak cylinder pressure, a total heat released, and a total duration of heat released from the cylinder pressure over a complete combustion cycle for the cylinder in which the non-fueling interval is identified,
compare at least one of the indicated mean effective pressure, the peak cylinder pressure, the total heat released, and the total duration of heat released of the identified cylinder to a corresponding predefined threshold value,
determine whether at least one of the indicated mean effective pressure, the peak cylinder pressure, the total heat released, and the total duration of heat released of the identified cylinder exceeds the corresponding predefined threshold value, and
generate a signal indicating impending failure of the identified cylinder, when at least one of the indicated mean effective pressure, the peak cylinder pressure, the total heat released, and the total duration of heat released of the identified cylinder exceeds the corresponding predefined threshold value.

17. The dual fuel engine system of claim 16, wherein the controller is further configured to cutoff fuel supply to the identified cylinder for which at least one of the indicated mean effective pressure, the peak cylinder pressure, the total heat released, and the total duration of heat released is determined as being in excess of the corresponding predefined threshold value.

18. The dual fuel engine system of claim 17, wherein the controller is further configured to cutoff supply of a first fuel to a first fuel injector and cutoff supply of a second fuel to a second fuel injector, the first fuel injector and the second fuel injector being associated with the identified cylinder for which at least one of the indicated mean effective pressure, the peak cylinder pressure, the total heat released, and the total duration of heat released is determined as being in excess of the corresponding predefined threshold value.

19. The dual fuel engine system of claim 16, wherein in response to at least one of the indicated mean effective pressure, the peak cylinder pressure, the total heat released, and the total duration of heat released of the identified cylinder being in excess of the corresponding predefined threshold value, the controller is further configured to derate an amount of maximum output power available from the engine.

20. The dual fuel engine system of claim 16, wherein each of the pressure sensors is an in-cylinder pressure sensor.

\* \* \* \* \*